(12) United States Patent
Warnke

(10) Patent No.: US 6,689,007 B2
(45) Date of Patent: Feb. 10, 2004

(54) MANUAL VALVE FOR AUTOMATIC TRANSMISSION

(75) Inventor: Robert C. Warnke, Salem, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 70 days.

(21) Appl. No.: 10/062,810

(22) Filed: Feb. 5, 2002

(65) Prior Publication Data
US 2003/0148844 A1 Aug. 7, 2003

(51) Int. Cl.$^7$ ................................................ F16K 13/10
(52) U.S. Cl. .................... 475/131; 475/130; 137/49; 137/247.17; 251/325
(58) Field of Search ................. 475/127, 130, 475/131, 134; 137/49, 247.17; 251/324, 325

(56) References Cited

U.S. PATENT DOCUMENTS

| | | | | |
|---|---|---|---|---|
| 3,459,071 A | * | 8/1969 | Schaefer | 475/130 X |
| 3,998,111 A | * | 12/1976 | Blake | 475/134 X |
| 4,111,071 A | * | 9/1978 | Pearce et al. | 475/127 |
| 5,031,656 A | * | 7/1991 | Benford et al. | 137/238 |
| 5,327,800 A | * | 7/1994 | Van Selous | 475/131 |
| 6,139,459 A | * | 10/2000 | Suzuki | 475/127 |
| 6,440,028 B2 | * | 8/2002 | Kim et al. | 475/131 |

FOREIGN PATENT DOCUMENTS

JP  356164267  * 12/1981 ............. 475/131

OTHER PUBLICATIONS

Photograph of all known aftermarket manual valves for Chrysler transmissions prepared by applicant, Robert C. Warnke, dated Nov. 15, 2001 depicting manual valves marketed by TransGo, Inc., 2621 Merced Ave., El Monte, California 91733; Superior Transmission Parts, Inc., 3770 Hartsfield Road, Tallahassee, Florida 32303; Red–Butt Engineering (address unknown); and Sonnax Industries, Inc., assignee of this patent application.

Instruction sheets (copyright 1988 by Gilbert W. Younger) pertaining to installation of TransGo aftermarket manual valve sold by TransGo Inc., 2621 Merced Ave., El Monte, CA 91733 depicting the manual valve within the valve body of the transmission (Ref. Steps 1 and 3, pp. not numbered).

Instruction sheet (copyright 1999, Superior Transmission Parts) pertaining to installation of Superior's aftermarket manual valve sold by Superior Transmission Parts, Inc., 3770 Hartsfield Road, Tallassee, Florida 32303 depicting the manual valve within the valve body of the Chrysler A500/A518 transmissions (Ref. Step 5, pp. not numbered).

Instruction sheet (Red–Butt Engineering–undated) pertaining to installation of torqueflite TransButty kit developed by Red–Butt Engineering (address unknown) illustrating the redesigned configuration of the manual valve for Chrysler tarnsmissions (Ref. p. 5).

* cited by examiner

Primary Examiner—Ha Ho
(74) Attorney, Agent, or Firm—Clifford F. Rey

(57) ABSTRACT

A manual valve for use within the hydraulic control system of Chrysler automatic transmissions. The present manual valve includes flow control structures to vary its standard functions. In a preferred embodiment the manual valve includes a secondary control land, which blocks and redirects hydraulic fluid to an alternate exhaust channel within the present valve when Park gear range is selected. A control orifice meters flow within the alternate exhaust channel and generates a predetermined backpressure to the pressure regulator valve, which provides an increased flow of hydraulic fluid to the torque converter in the Park gear range. This effectively eliminates delayed engagement of the transmission upon shifting into the Drive and Reverse gear ranges. In addition, the present manual valve includes a reverse metering land, which regulates the effect of fluid shock on the reverse servo piston when the Reverse gear range is selected.

27 Claims, 6 Drawing Sheets

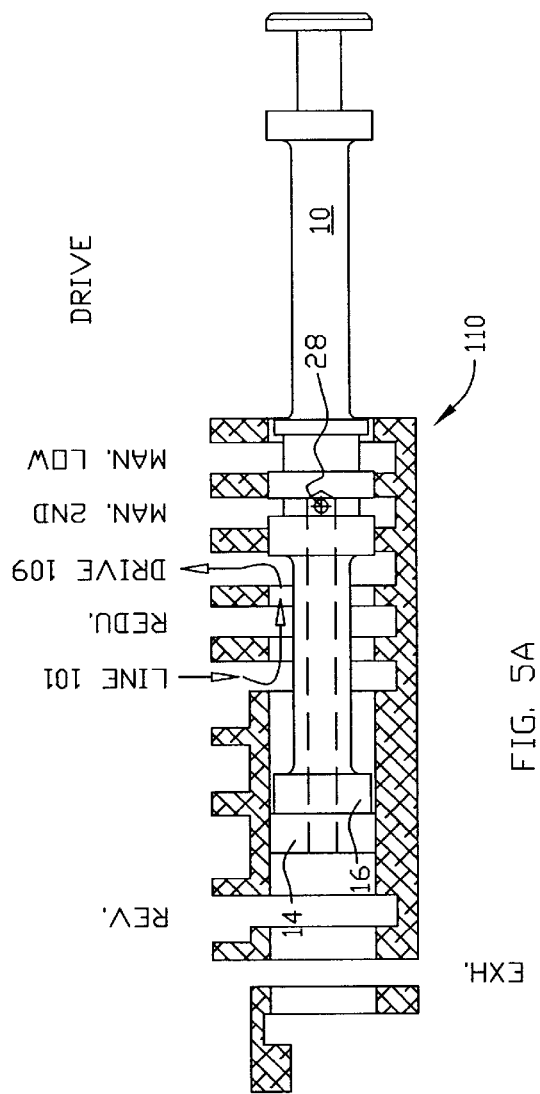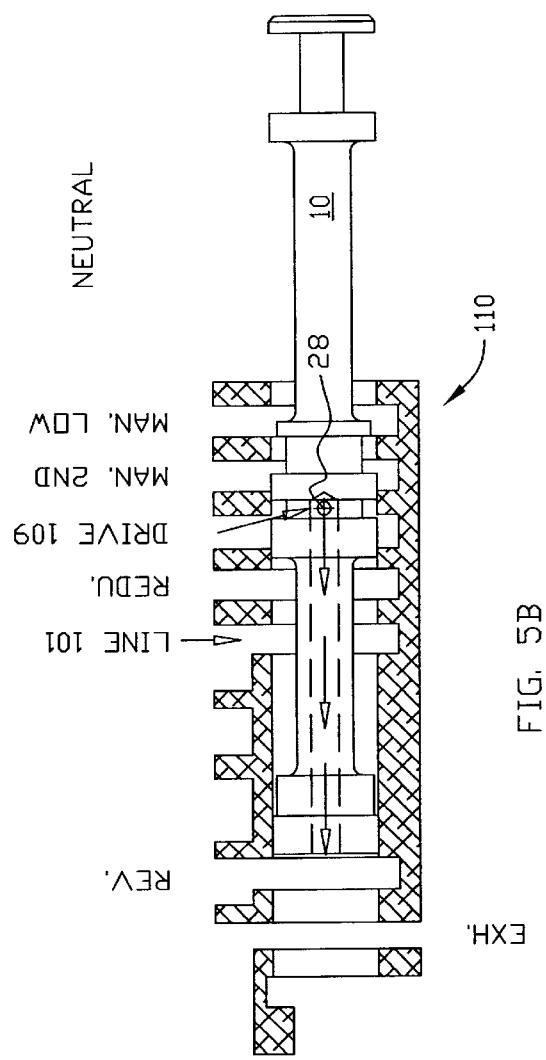

MANUAL VALVE FOR AUTOMATIC TRANSMISSION

BACKGROUND OF INVENTION

1. Field of Invention

The present invention relates to automatic transmission systems and, more particularly to an improved Manual Valve for Chrysler 40RH, 42RH, 42RE, 46RH and 46RE transmissions (hereinafter "Chrysler transmissions").

Automatic transmission systems of the prior art have a hydraulic circuit sub-system which includes at least a hydraulic pump, a valve body having fluid conducting passages or circuits, input and exhaust ports formed within the fluid circuits, and a plurality of so-called "spool" valves comprised of modified pistons which alternately open and close the ports to regulate the flow and pressure of automatic transmission fluid (hereinafter "ATF") within the fluid circuits to actuate different components of the transmission. It will be understood that in describing hydraulic fluid circuits, ATF usually changes names when it passes through an orifice or control valve in a specific circuit.

The Manual Valve in an automatic transmission is a spool valve connected by linkage or cable to the shift lever inside the passenger compartment. The Manual Valve, which is also connected to the manual lever on the side of the transmission, directs fluid flow within the transmission to provide the correct type of operation for the selected gear range. For example, when Neutral or Park are selected, ATF is directed to pressure reducing circuits and to exhaust sending line pressure back to the transmission sump such that no apply devices are engaged. When Reverse is selected, the pressure reducing circuits and exhaust port are blocked sending line pressure to apply reverse gear. When Drive is selected, ATF is directed to the Drive control circuits including the forward clutch and the governor feed circuit to operate the transmission.

Vehicles utilizing the aforementioned Chrysler transmissions typically do not deliver sufficient ATF to the torque converter/cooler charge circuits when the transmission is in Park. This presents a problem in that the torque converter must be filled with ATF to engage the transmission. Insufficient ATF level in the torque converter results in delayed engagement upon shifting into Drive or Reverse. Further, torque converter bushing failure may eventually occur.

2. Description of Related Prior Art

Various efforts have been made in the transmission parts aftermarket industry to alter the configuration of the OEM manual valve in the aforementioned Chrysler transmissions to eliminate the delayed engagement problem upon shifting from Park into Drive and/or Reverse gear ranges as described hereinabove. For example, aftermarket manual valves developed by TransGo, Inc., Merced, Calif.; Superior Transmission Parts, Inc., Tallahassee, Fla.; and Red-Butt Engineering, have been marketed for this purpose. However, such previous reconfigurations of the Chrysler manual valve have focused primarily on blocking the flow of ATF to exhaust when the Park gear range is selected to generate an overall increase in line pressure thereby actuating the Pressure Regulator Valve to increase ATF feed to the torque converter/cooler charge circuits without adequate consideration for other apply devices affected by the line pressure increase.

More particularly, such aftermarket manual valves have failed to control the resulting increased line pressure to the Pressure Regulator Valve at consistent levels to prevent ATF feed to and partial actuation (i.e. dragging) of the forward clutch while in Park gear range. Thus, installation of the aforementioned aftermarket manual valves during maintenance service and/or transmission overhaul has resulted in erratic line pressure levels and subsequent burnout of the forward clutch.

Further, the aftermarket manual valves described hereinabove typically require that physical alteration of the manual valve and/or valve body by the service technician be performed prior to installation in the Chrysler transmissions producing inconsistent results.

Thus, the present invention has been developed to resolve these problems and other shortcomings of the prior art.

SUMMARY OF THE INVENTION

Accordingly, the present invention is an improved Manual Valve, which is a direct replacement for the original equipment manufacture (hereinafter "OEM") Manual Valve that is standard equipment on many transmissions made available on Chrysler rear wheel drive vehicles and which will be referred to throughout this specification.

The Manual Valve of the present invention has been redesigned to change the configuration of the control diameters or lands such that when Park is selected, ATF flow to the Park pressure reducing circuits is blocked thereby increasing ATF pressure in the Throttle Valve (hereinafter "TV") circuit, which controls changes in the position of the Pressure Regulator Valve. This elevated fluid pressure in the TV circuit actuates the Pressure Regulator Valve opening the torque converter/cooler feed circuits to charge the torque converter while in Park. Thus, delayed engagement of the transmission upon shifting into Drive or Reverse is eliminated and the increased ATF flow in the torque converter/cooler charge circuits provides additional lubrication and reduces torque converter bushing failure.

In addition, the present Manual Valve also includes an integrally formed ATF control orifice and an alternate exhaust channel, which function to meter the exhaust of ATF via the alternate exhaust channel when the Park gear range is selected thereby generating a predetermined backpressure in the TV circuit and imparting improved stability to the Pressure Regulator Valve to prevent slippage and premature wear of the forward clutch.

Further, a Reverse fluid metering diameter or land has been added to the present Manual Valve to reduce the initial ATF pressure applied to the Reverse servo piston and Low/Reverse clutch band when Reverse gear is selected to prevent damage thereto, which is also problematic in the Chrysler transmissions.

Thus, it is an object of the present invention to provide an improved Manual Valve which functions to limit the flow of ATF to exhaust when the Park gear range is selected thereby increasing hydraulic fluid pressure to the Pressure Regulator Valve and opening the torque converter/cooler charge circuits to charge the torque converter.

Another object of the present invention is to provide an improved Manual Valve having an ATF control orifice disposed in fluid communication with an alternate exhaust channel, which functions to meter the exhaust of ATF via the alternate exhaust channel when the Park gear range is selected thereby generating a predetermined backpressure in the TV circuit and imparting improved stability to the Pressure Regulator Valve.

Another object of the present invention is to provide an improved Manual Valve including a Reverse fluid metering land to minimize the initial fluid shock applied to the Reverse servo piston and Low/Reverse clutch band when Reverse gear is selected to prevent damage thereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 5A is a partial section of the OEM valve body illustrating the position of the present Manual Valve in the Drive operating range;

FIG. 5B is a partial section of the OEM valve body illustrating the position of the present Manual Valve in the Neutral operating range.

DETAILED DESCRIPTION OF THE PREFERRED EMBODIMENTS

Figure 1:
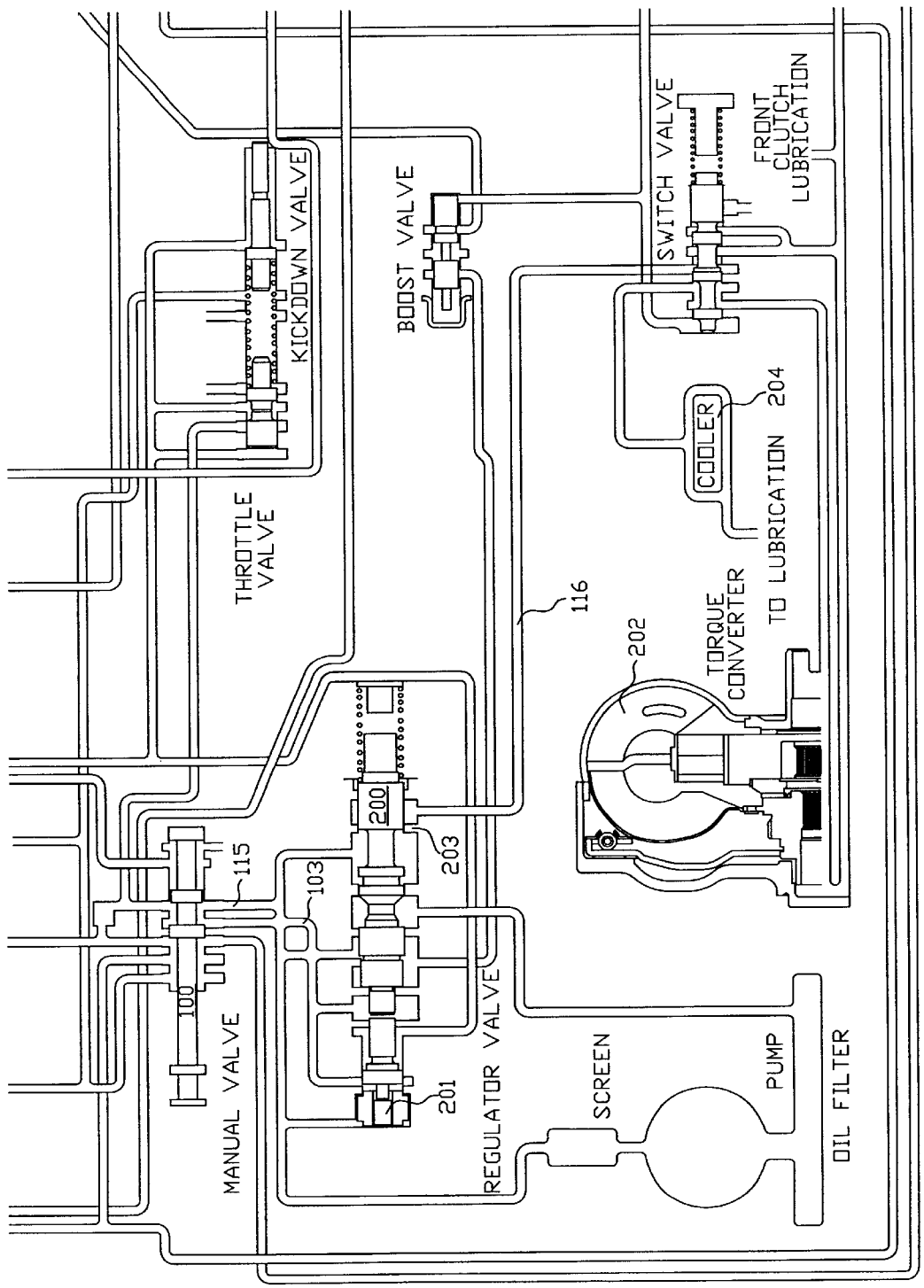
FIG. 1 is a schematic drawing of a portion of the hydraulic system of the Chrysler transmission labeled Prior Art showing the Manual Valve in its functional position.

Prior to describing the present invention in detail it may be beneficial to briefly review the structure and function of a Manual Valve within the hydraulic system of the Chrysler transmissions. Referring to FIG. 1 there is shown therein a schematic view of a portion of the hydraulic system of the aforementioned Chrysler transmissions wherein an OEM Manual Valve, indicated generally at 100, is illustrated.

Figure 2:
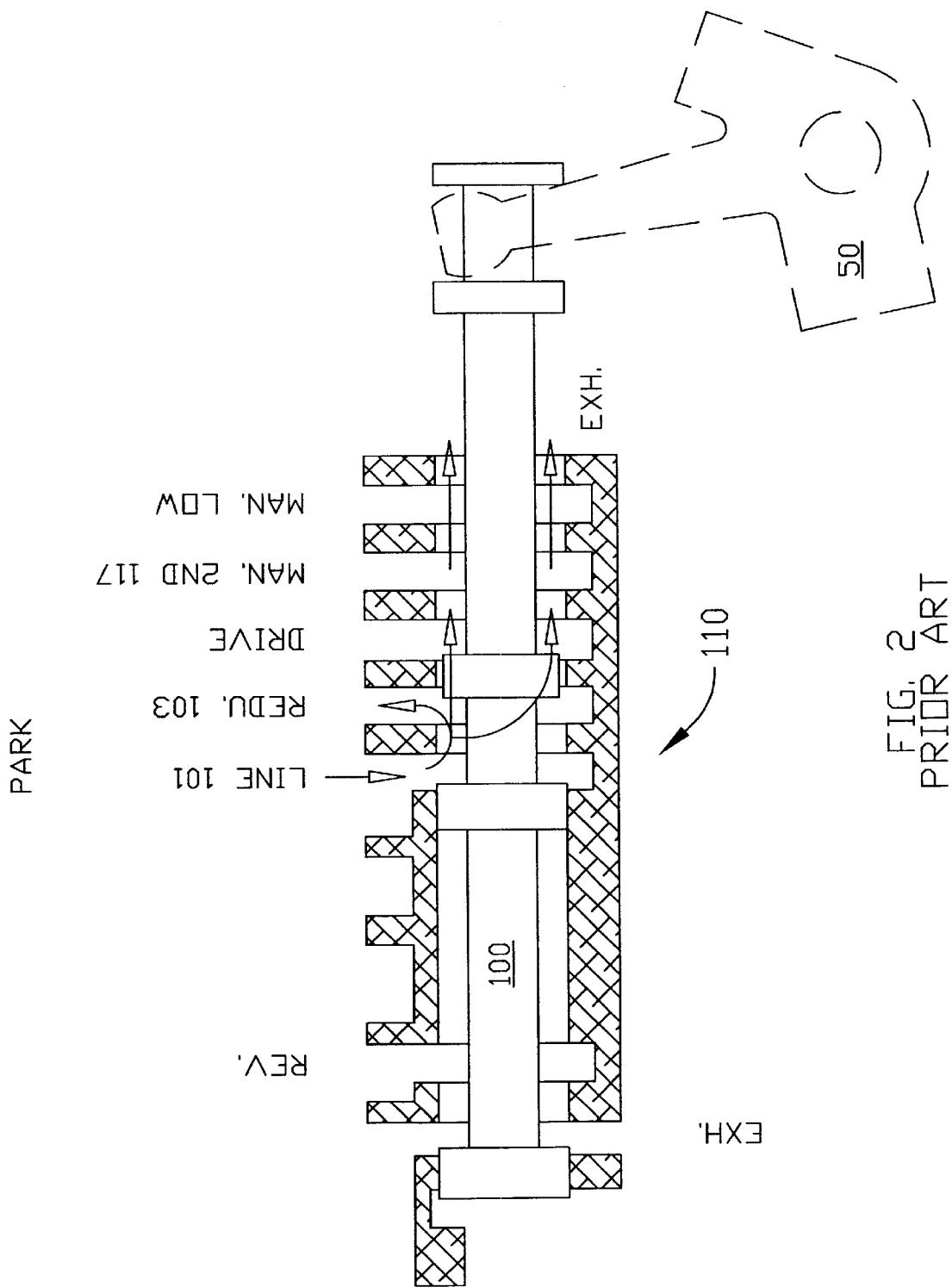
FIG. 2 is a partial section of the OEM valve body labeled Prior Art illustrating the position of the Manual Valve in the Park operating range.

As more clearly shown in FIG. 2, the Manual Valve 100 is a spool valve connected by mechanical linkage and/or a cable to the shift lever inside the passenger compartment and also to the manual lever by mechanical linkage 50 on the outside of the transmission housing. The Manual Valve 100 functions to direct fluid flow within the transmission to provide the correct type of operation for the selected gear range. For example, when Neutral or Park is selected, ATF under line pressure (55–65 psi) as at 101 from the pump (not shown) directed to exhaust and flows back to the transmission sump. Thereafter, when Drive is selected, ATF is redirected to the Drive control circuits including the forward clutch (not shown) and governor feed circuit (not shown) to operate the transmission.

A particular problem exists in Chrysler rear wheel drive vehicles in that the OEM Manual Valve 100 in these Chrysler transmissions does not supply sufficient ATF via the Pressure Regulator Valve 200 to the torque converter 202 and the transmission cooler 204 (FIG. 1) via their corresponding circuits when the transmission is in the Park operating range. More particularly, this results in a low ATF level in the torque converter 202, which causes delayed engagement when shifting into Drive or Reverse gear ranges, and further can result in torque converter bushing failure. Thus, the present invention provides an improved Manual Valve for such Chrysler rear wheel drive vehicles, which resolves this problem and other related problems and will now be described.

Figure 3:
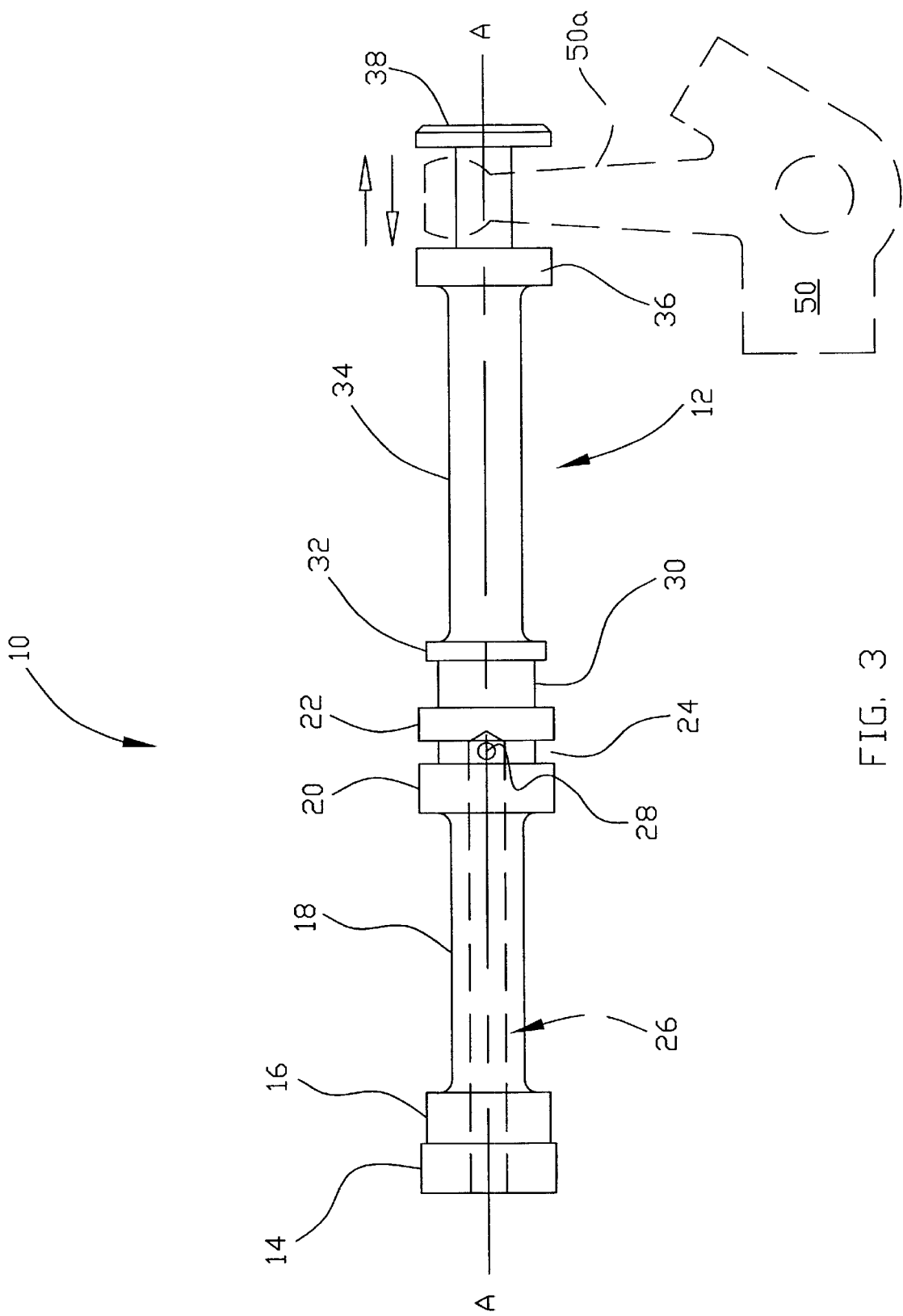
FIG. 3. is an elevational view of the present Manual Valve showing details of the construction thereof.

Referring to FIG. 3 there is shown therein a replacement Manual Valve for a Chrysler transmission in accordance with the present invention, indicated generally at 10. The present Manual Valve 10 is an elongated, cylindrical construction having a plurality of port control diameters or lands formed thereon, which control the flow of ATF into the various fluid circuits corresponding to a selected gear range.

More particularly, the Manual Valve 10 comprises an elongated piston, indicated generally at 12, having a Park control land 14 formed at a first end thereof, which is stopped in the valve body 110 at a terminal end of the mating bore 105 when the gear selector is placed in Park. It will be understood that in this functional aspect the present valve 10 is substantially similar to the OEM valve 100.

The present valve piston 12 also includes an adjacent Reverse metering land 16, which functions to regulate the flow of ATF to the Front Clutch drum (not shown) and to the Low/Reverse band (not shown) when Reverse gear is selected to prevent severe vibration and/or so-called "fluid shock" to the Reverse servo piston and possible breakage of the Low/Reverse band, which has been problematic in the Chrysler transmissions as explained hereinafter in further detail.

An elongated stem 18 integrally connects the Reverse metering land 16 with a primary control diameter 20 and a secondary control diameter 22, which are separated by an annular groove 24. The Park control land 14 in combination with the primary and secondary control diameters 20, 22 function to guide the piston 12 within the bore 105 and also to alternately open and/or close the various fluid circuits to provide the correct type of operation for the gear range selected.

Still referring to FIG. 3 it can be seen that the piston 12 is provided with an ATF exhaust channel, indicated generally at 26, formed in coaxial relation to the longitudinal axis—A—and extending to a terminal left end face of the piston 12 as shown. The exhaust channel 26 is disposed in fluid communication with the groove 24 via at least one ATF control orifice 28, which extends radially from the channel 26 and connects with the groove 24. The control orifice 28 functions to limit the flow of ATF to exhaust when the Park gear range is selected thereby increasing hydraulic fluid pressure to the Pressure Regulator Valve 200 and opening the torque converter/cooler charge circuits to charge the torque converter. Alternatively, control orifice 28 serves to reduce hydraulic fluid pressure in the Drive circuit when shifting from Drive to the Park or Reverse gear ranges as explained hereinafter in further detail.

The present piston 12 also includes a relief diameter 30, which is integrally formed with secondary control diameter 22. Relief diameter 30 interconnects control diameter 22 to a Manual Low diameter 32, which functions to meter the flow of ATF to the Manual Low fluid circuit as at 117 (FIG. 4) when Manual Low gear is selected. In this functional aspect the Manual Low diameter 32 is substantially the same as in the OEM design.

An elongated stem 34 interconnects the manual low diameter 32 with linkage guide diameters 36 and 38, which engage and provide contact surfaces for an articulating arm 50a of the mechanical linkage member 50 shown in phantom outline. The linkage member 50 is mechanically coupled to the manual lever (not shown) located on the side of the transmission, which provides for axial movement of the piston 12 as shown by directional arrows when selecting a gear range with the vehicle's shift lever (not shown).

Figure 4:
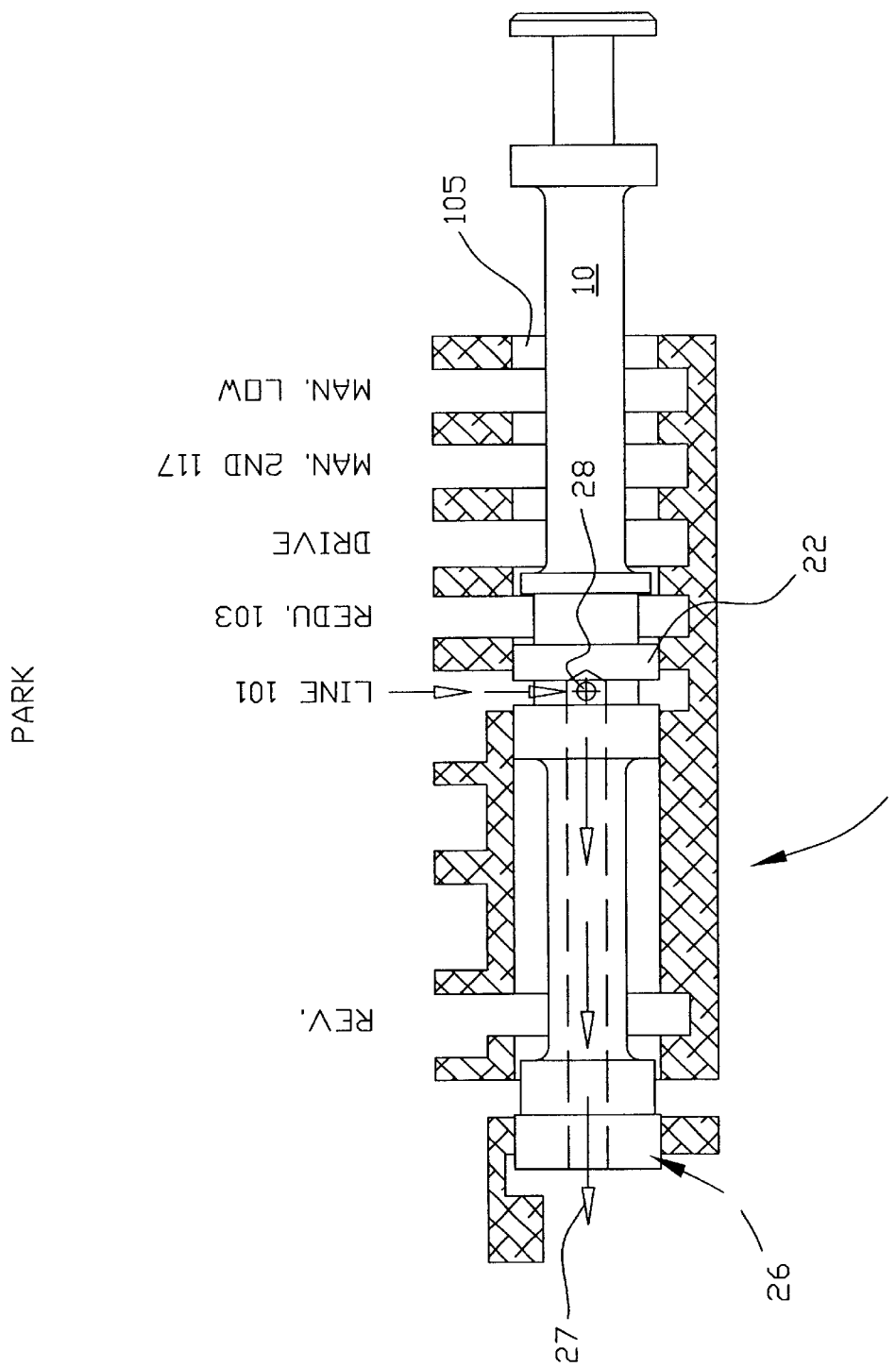
FIG. 4 is a partial section of the OEM valve body illustrating the position of the present Manual Valve in the Park operating range.

The present invention also provides structures and functional features, which comprise backpressure generating means including, but not limited to, the following structures. With reference to FIG. 4 the present manual valve 10 is shown installed in the OEM valve body 110 in the Park position in replacement of the OEM valve 100. In operation, it can be seen that in the Park position the secondary control land 22 blocks ATF line pressure as at 101 from exhausting to the sump via pressure reducing circuit. To compensate for this blocked exhaust circuit, the present manual valve 10 provides an alternate path for the exhaust of line pressure via control orifice 28 to the exhaust channel 26 as shown by directional arrows 27.

In the present Manual Valve 10 the control orifice 28 is calibrated to slow the rate at which line pressure is exhausted via channel 26 in the Park gear range. This restriction of the flow of ATF to exhaust in the Park range is designed to generate backpressure to the line pressure plug 201 via circuit 115 (FIG. 1) which, in turn, strokes the Pressure Regulator Valve 200 against spring pressure (i.e. to the right in FIG. 1). This causes the port 203 to the torque converter/cooler charge circuit 116 to open increasing ATF flow to the torque converter 202. This increased ATF flow fills the torque converter 202 while in the Park gear range and effectively eliminates delayed engagement of the transmission upon shifting into the Drive or Reverse gear ranges.

The diameter of control orifice 28 is calibrated to adjust the aforementioned backpressure to a predetermined level. In the preferred embodiment control orifice 28 is dimensioned in the range of Ø 0.062–Ø 0.110 inches for different transmission applications.

By metering the flow of ATF to exhaust via control orifice 28 a consistent, increased level of line pressure is maintained to the Pressure Regulator Valve 200, which feeds ATF to the torque converter/cooler charge circuits 116 in the Park gear range. In addition to filling the torque converter 202 while in Park, the stabilized line pressure also maintains the check valve i.e. #8 checkball (not shown), which controls ATF feed to the forward clutch, to a closed condition to prevent dragging of the forward clutch while in the Park gear range.

When shifting from Drive back to Neutral/Reverse, control orifice 28 functions to reduce fluid pressure in the Drive circuit by permitting the flow of ATF to exhaust as shown in FIGS. 5A and 5B. FIG. 5A illustrates the present manual valve 10 in the Drive gear range. It can be seen that in the Drive gear range, line pressure as at 101 flows directly to the Drive circuits as at 109 to actuate the forward clutch. When the manual valve 10 is shifted to the Neutral position (FIG. 5B) and, thereafter, into the Reverse gear range (FIG. 6), it can be seen that the secondary control land 22 does not permit the flow of ATF to exhaust as in the OEM manual valve 100 (FIG. 2). However, in the Neutral position (FIG. 5B), the control orifice 28 provides an alternate route for the return flow of ATF to the exhaust channel 26 and thereafter to the transmission sump. In this manner the forward clutch is instantaneously released upon shifting out of the Drive range to prevent the slippage and premature wear of the clutch.

Figure 6:
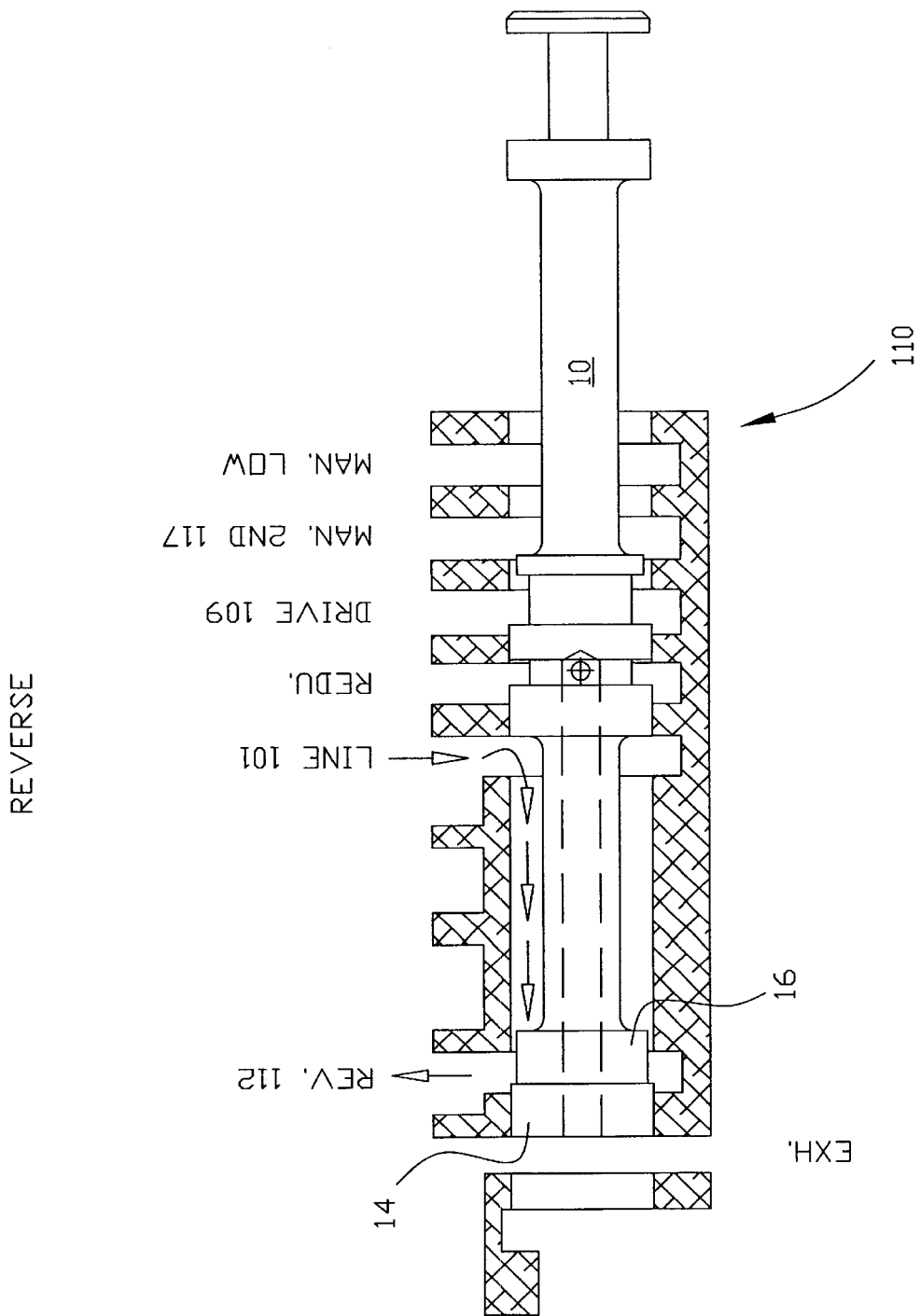
FIG. 6 is a partial section of the OEM valve body illustrating the position of the present Manual Valve in the Reverse operating range.

The present invention also provides structures and functional features, which comprise fluid shock reducing means including, but not limited to, the following structures. FIG. 6 illustrates the present manual valve 10 installed in the OEM valve body 110 in the Reverse gear position in replacement of the OEM valve 100. In operation, it can be seen that in the Reverse position, the reverse metering diameter 16 partially blocks the flow of ATF to the reverse fluid circuit as at 112. The Reverse metering diameter 16 functions to regulate the force of ATF flowing to the Reverse servo-piston (not shown), which actuates the reverse clutch band. In the OEM Manual Valve 100 (FIG. 2), when fluid under line pressure (55–65 psi) is sent to the reverse servo-piston it arrives with substantial force. Since the ATF is not compressible it produces a phenomena called "fluid shock", which can cause severe vibration and damage to the Reverse servo-piston and/or the Reverse clutch band. The present Manual Valve 10 including the Reverse metering diameter 16 alleviates the "fluid shock" phenomena in the Reverse clutch circuit, which is a known and undesirable characteristic of the Chrysler transmissions.

Although not specifically illustrated in the drawings, it should be understood that additional equipment and structural components will be provided as necessary and that all of the components described above are arranged and supported in an appropriate fashion to form a complete and operative manual valve incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An improved manual valve for an automatic transmission, said manual valve having a plurality of control lands formed thereon including a Park control land and a primary control land to control the flow of hydraulic fluid within the valve body of said transmission to provide proper operation for a selected gear range including Park, Neutral, Reverse, Drive, Manual Second, and Manual Low gear ranges, wherein the improvement comprises:

flow restricting means formed on said manual valve including a secondary control land for blocking the flow of said hydraulic fluid to pressure reducing circuits in said Park gear range; and backpressure generating means integrated within said manual valve for generating backpressure to a pressure regulator valve within a first fluid circuit in said valve body in order to effect an increase in the flow of said hydraulic fluid within a second fluid circuit when said Park gear range is selected.

2. The improved manual valve of claim 1 further including a reverse metering land formed on said valve for regulating the flow of hydraulic fluid within a reverse circuit of said valve body to reduce hydraulic fluid shock acting upon a reverse servo piston when said Reverse gear range is selected.

3. The improved manual valve of claim 1 wherein said backpressure generating means includes at least one fluid control orifice disposed in fluid communication with an exhaust channel formed within said manual valve.

4. The improved manual valve of claim 3 wherein said at least one fluid control orifice is calibrated to produce a predetermined backpressure within said first fluid circuit when said Park gear range is selected.

5. The improved manual valve of claim 1 wherein said backpressure generating means also functions as a pressure reducing means when said manual valve is shifted from said Drive gear range to said Neutral gear range to prevent slippage of a forward clutch.

6. In an automatic transmission of a motor vehicle that has a manual valve having a plurality of control lands formed thereon including a Park control land and a primary control land to control the flow of hydraulic fluid within the valve body of said transmission to provide proper operation for a selected gear range including Park, Neutral, Reverse, Drive, Manual Second, and Manual Low gear ranges, said manual valve being connected by a first hydraulic circuit to a pressure regulator valve mechanism which is further connected by a second fluid circuit to a torque converter and a transmission cooler, the improvement comprising:

flow restricting means formed on said manual valve for restricting the flow of hydraulic fluid to exhaust when said Park gear range is selected such that a predetermined backpressure is generated in said first hydraulic circuit to said pressure regulator valve mechanism increasing the flow of said hydraulic fluid via said second hydraulic circuit to fill said torque converter such that delayed engagement of said torque converter upon shifting to said Drive gear range is eliminated.

7. The automatic transmission of claim 6 wherein said flow restricting means includes a secondary control land integrally formed in coaxial relation to said primary control land, said secondary control land blocking the flow of said fluid to a pressure reducing circuit when said Park gear range is selected thereby generating said backpressure in said first hydraulic circuit.

8. The automatic transmission of claim 7 wherein said flow restricting means further includes at least one fluid control orifice disposed in fluid communication with an exhaust channel formed in said manual valve along the longitudinal axis thereof.

9. The automatic transmission of claim 8 wherein said at least one fluid control orifice is positioned within an annular groove formed in said manual valve intermediate said primary and said secondary control lands.

10. The automatic transmission of claim 9 wherein said at least one fluid control orifice is calibrated to generate a predetermined fluid backpressure for specific transmission applications.

11. The automatic transmission of claim 10 wherein said at least one fluid control orifice measures in the range of Ø 0.062–0.110 inches.

12. The automatic transmission of claim 6 further including fluid shock reducing means for regulating the flow of said hydraulic fluid within a reverse circuit of said valve body to reduce fluid shock acting upon a reverse servo when said Reverse gear range is selected.

13. The automatic transmission of claim 12 wherein said fluid shock reducing means includes a reverse metering land integrally formed with said Park control land in coaxial relation thereto.

14. In an automatic transmission including a manual valve having a primary control land for regulating the flow of hydraulic fluid within the valve body of said transmission to provide proper operation for a selected gear range including Park, Reverse, Neutral, Drive, Manual Second, and Manual Low gear ranges, said transmission further including a Pressure Regulator Valve in fluid communication with said Manual Valve and also with torque converter/cooler charge circuits within said valve body, the method of increasing hydraulic fluid flow to the said torque converter/cooler charge circuits in the Park gear range, said method comprising the steps of:

providing a replacement manual valve including backpressure generating means and a secondary control land for blocking the flow of hydraulic fluid to exhaust circuits when said Park gear range is selected;

blocking the flow of said hydraulic fluid to said exhaust circuits with said secondary control land;

redirecting the flow of said hydraulic fluid to an alternate exhaust circuit integrated within said replacement manual valve;

generating a predetermined backpressure within a first hydraulic circuit interconnecting said replacement manual valve and said Pressure Regulator Valve; and actuating said Pressure Regulator Valve responsive to said backpressure to increase the flow of said hydraulic fluid via a second hydraulic circuit to said torque converter/cooler charge circuits.

15. The method of claim 14 wherein the step of generating further includes the steps of:

metering the flow of said hydraulic fluid through said backpressure generating means; and restricting the flow of said hydraulic fluid to said alternate exhaust circuit such that a predetermined level of backpressure is generated in said first hydraulic circuit.

16. The method of claim 14 wherein the step of actuating is carried out by a line pressure plug disposed in said first hydraulic circuit adjacent said Pressure Regulator Valve.

17. The method of claim 15 wherein the step of metering is carried out by a control orifice formed in fluid communication with said alternate exhaust circuit.

18. A manual valve for providing proper operation of an automatic transmission in a selected gear range including Park, Neutral, Reverse, Drive, Manual Second, and Manual Low gear ranges, comprising:

a valve piston having a plurality of concentric control lands formed thereon including a Park control land, a primary control land, and a secondary control land, said secondary control land functioning to block the flow of hydraulic fluid to pressure reducing circuits in said Park gear range;

an exhaust channel formed within said piston coextensive with the longitudinal axis at a first end thereof; and at least one fluid control orifice disposed in fluid communication with said exhaust channel for generating backpressure within a first fluid circuit in a valve body within said transmission to effect an increased flow of said hydraulic fluid within a second fluid circuit thereby supplying a torque converter circuit and a transmission cooler circuit when said Park gear range is selected.

19. The manual valve of claim 18 further including a reverse metering land formed on said valve for regulating the flow of hydraulic fluid within a reverse circuit of said valve body to reduce hydraulic fluid shock acting upon a reverse servo piston when said Reverse gear range is selected.

20. The manual valve of claim 19 wherein said reverse metering land is integrally formed with said Park control land in coaxial relation thereto.

21. The manual valve of claim 18 wherein said at least one fluid control orifice is calibrated to generate a predetermined backpressure within said first fluid circuit when said Park gear range is selected.

22. The manual valve of claim 21 wherein said at least one fluid control orifice measures in the range of Ø 0.062–0.110 inches.

23. The manual valve of claim 20 wherein said at least one fluid control orifice also functions as a pressure reducing means when said manual valve is shifted from said Drive gear range to said Neutral gear range to prevent slippage of a forward clutch.

24. A manual valve for use in combination with a valve body of an automatic transmission comprising:
- a valve piston having a plurality of concentric control lands formed thereon including a Park control land, a primary control land, a secondary control land, said secondary control land functioning to block the flow of hydraulic fluid to pressure reducing circuits in the Park gear range and a reverse metering control land, said reverse metering control land regulating the flow of hydraulic fluid within a reverse circuit of said valve body to reduce hydraulic fluid shock acting upon a reverse servo piston when Reverse gear range is selected;
- an exhaust channel formed within said piston coextensive with the longitudinal axis at a first end thereof; and
- at least one fluid control orifice disposed in fluid communication with said exhaust channel for generating backpressure within a first fluid circuit in said valve body to effect an increased flow of said hydraulic fluid within a second fluid circuit when said Park gear range is selected.

25. The manual valve of claim 24 wherein said at least one fluid control orifice is calibrated to generate a predetermined backpressure within said first fluid circuit when Park gear range is selected.

26. The manual valve of claim 25 wherein said at least one fluid control orifice measures in the range of Ø 0.062–0.110 inches.

27. The manual valve of claim 26 wherein said at least one fluid control orifice also functions as a pressure reducing means when said manual valve is shifted from Drive gear range to Neutral gear range to prevent slippage of a forward clutch.

* * * * *